United States Patent [19]

Wheelock et al.

[11] Patent Number: 5,279,489
[45] Date of Patent: Jan. 18, 1994

[54] FLOOR MOUNTED CONTAINER HOLDER ASSEMBLY FOR A VEHICLE

[75] Inventors: Glenn E. Wheelock, Freemont; Gary Vallerga, Hayward, both of Calif.

[73] Assignee: Paccar Inc., Bellevue, Wash.

[21] Appl. No.: 950,022

[22] Filed: Sep. 24, 1992

[51] Int. Cl.⁵ .................................................. A47K 1/08
[52] U.S. Cl. ........................... 248/311.2; 224/42.45 R; 248/314
[58] Field of Search ................... 248/311.2, 314, 315, 248/310, 309.1, 316.1, 316.2, 316.3; 224/42.45 R; 220/737; 108/44, 45

[56] References Cited

U.S. PATENT DOCUMENTS

| | | |
|---|---|---|
| 541,864 | 7/1895 | Loomis . |
| 2,719,414 | 10/1955 | Davis . |
| 4,681,219 | 7/1987 | Kitchens . |
| 4,721,216 | 1/1988 | Kinder . |
| 4,738,423 | 4/1988 | Difilippo et al. ............... 248/311.2 |
| 4,765,581 | 8/1988 | Wallace et al. ............... 248/311.2 |
| 4,783,037 | 11/1988 | Flowerday ...................... 248/311.2 |
| 4,896,858 | 1/1990 | Sokolski et al. ............... 248/311.2 |
| 4,964,600 | 10/1990 | Lee .................................... 248/146 |
| 5,188,327 | 2/1993 | White ............................ 248/314 X |
| 5,190,259 | 3/1993 | Okazaki ......................... 248/311.2 |
| 5,191,679 | 3/1993 | Harper ...................... 248/311.2 X |
| 5,195,711 | 3/1993 | Miller et al. ................... 248/311.2 |

*Primary Examiner*—Ramon O. Ramirez
*Attorney, Agent, or Firm*—Flehr, Hohbach, Test, Albritton & Herbert

[57] ABSTRACT

A container holder assembly (20) for use in a vehicle for support of an elongated container (22) in a substantially vertical orientation. The holder assembly (20) comprises a base (24) having a wall (28), and a substantially rigid retaining collar (26). The collar (26) is mounted to the base (24) and defines an opening (30) dimensioned to receive the container (22) therethrough. A flexible sleeve (32) is mounted to the collar (26) and extends around and downwardly from the collar (26) to define a passageway (34) which is formed to receive the container (22) when positioned through the opening (30). An elastic band (36) is mounted to one of the base (24) and the sleeve (32) and is positioned below the retaining collar (26). Further, the band (36) extends around the passageway (34) and is sufficiently resilient to substantially perimetrically and laterally support the container (22) about a midportion thereof.

10 Claims, 2 Drawing Sheets

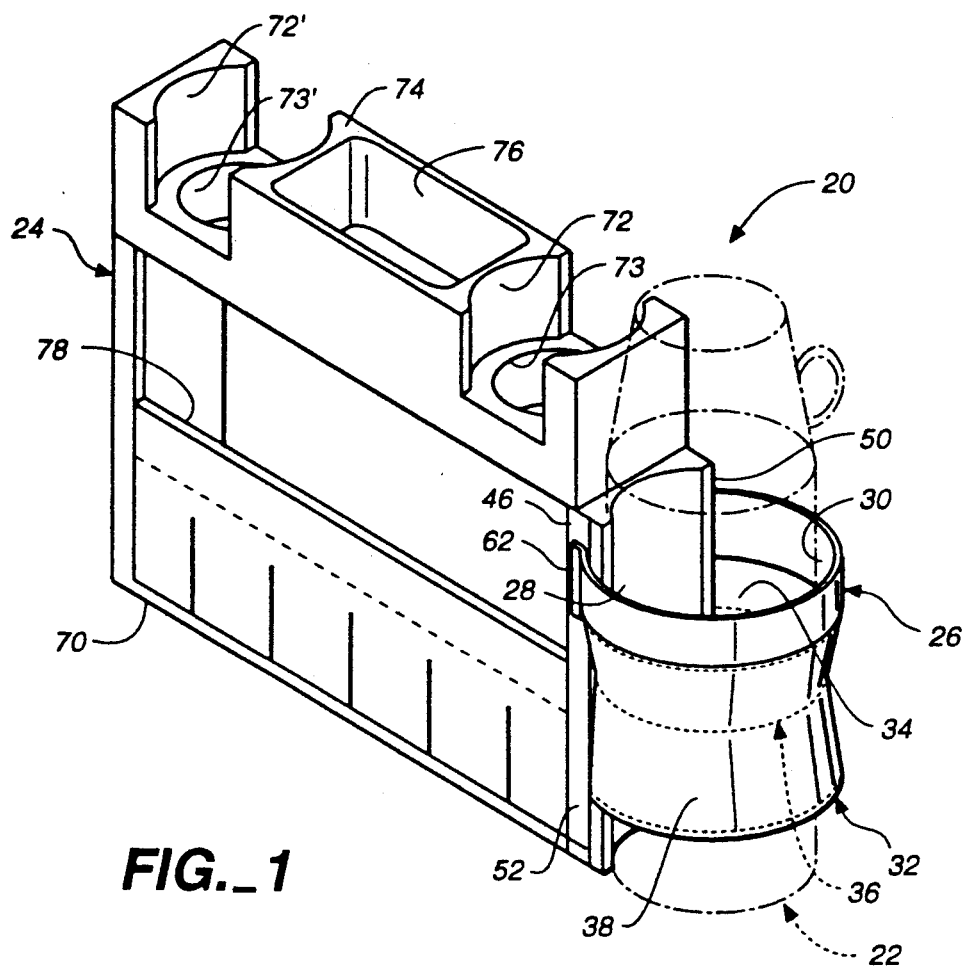
FIG._1
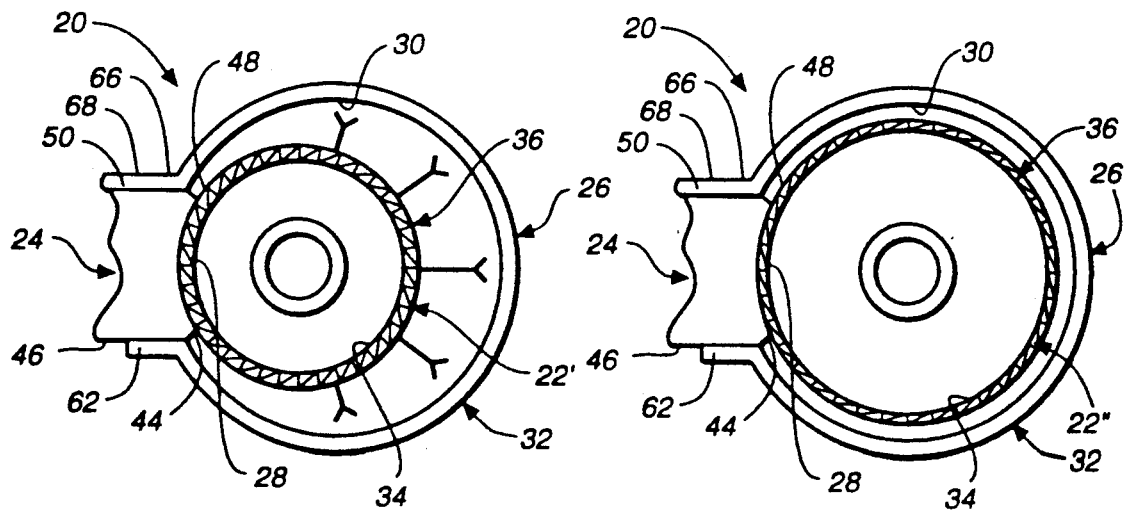
FIG._2A                FIG._2B

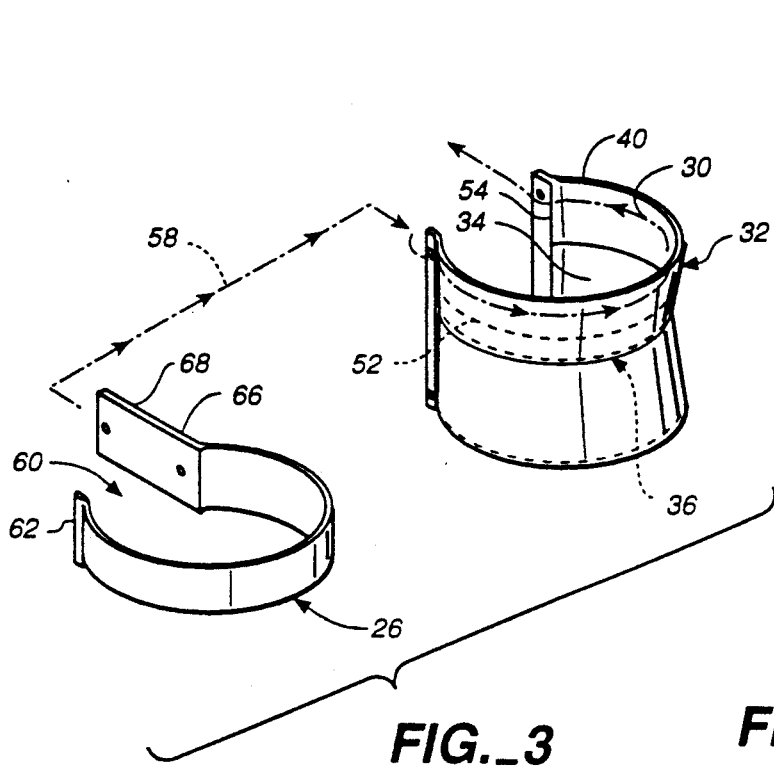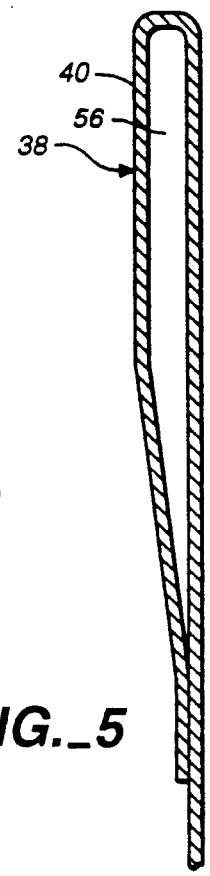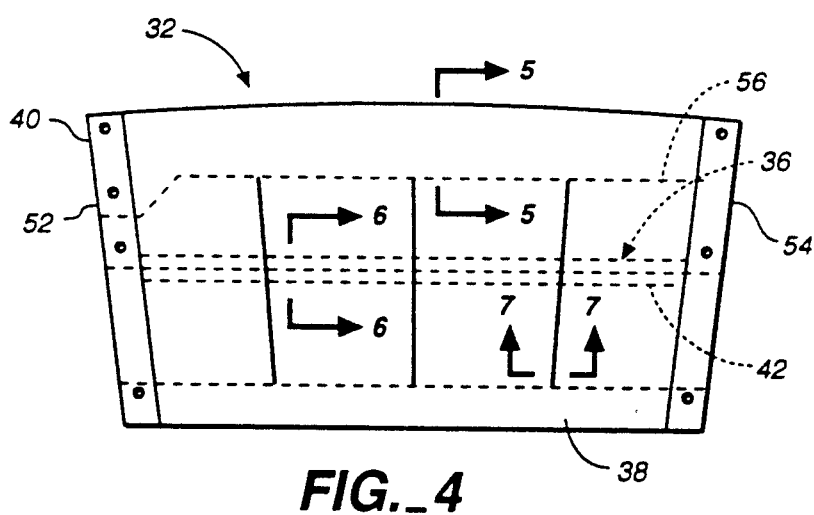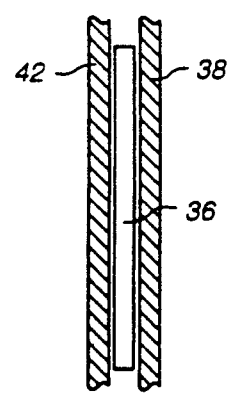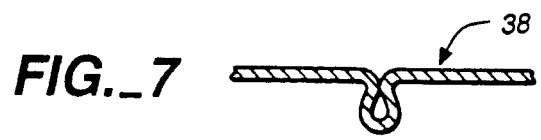
FIG._3
FIG._5
FIG._4
FIG._6
FIG._7

FLOOR MOUNTED CONTAINER HOLDER ASSEMBLY FOR A VEHICLE

TECHNICAL FIELD

The present invention relates, generally, to container holders and, more particularly, to floor mounted beverage container holders for vehicles.

BACKGROUND ART

The consumption of beverages while operating a motor vehicle is fairly common for the average motorist. This is particularly true when travelling distances are extreme. However, the driver is often confronted with the dilemma of manually supporting an opened container or placing it in an upright orientation somewhere within the interior of the vehicle. Continuous manual support of the beverage container can be particularly difficult, especially when operating a vehicle which often requires two-hands to operate. On the other hand, holding the container between their legs, placing it on the floor or between the driver and passenger seats creates opportunities for spillage and driver inattentiveness when the vehicle hits large road aberrations or the driver makes sharp turns or stops.

One way to overcome these problems is to provide a beverage container holder which supports the container in an upright orientation, thereby eliminating the need for continuous manual support by the operator. Vehicle manufactures have realized this problem and have begun offering container holders as standard equipment.

OEM or aftermarket holders, however, typically include receiving wells formed and dimensioned to provide substantial perimetric and lateral support to only certain containers of a predetermined diameter. For example, most holders are dimensioned to securely support the common 12 oz. aluminum can. Beverage containers having a diameter less than the maximum predetermined diameter, or having a transverse cross-sectional geometry inconsistent with the general cylindrical shape, tend to be easily knocked over by the vehicle occupants, slide around in the receiving well and/or tip over under normal driving conditions. Typical devices of this nature are disclosed in U.S. Pat. Nos. 4,681,219 to Kitchens; and 4,738,423 to DiFilippo et al..

In an attempt to provide container holders capable of perimetrically and laterally supporting a variety of different diameter and/or cross-sectional dimension containers, these holders have sometimes been provided with two-tier or multiple-tier receiving wells. For example, the receiving well may have included two different diameter cylindrical wells aligned concentrically. The smaller diameter receiving well would extend deeper into a base of the container holder while the larger diameter receiving well would be positioned concentrically above the smaller diameter well. Accordingly, those containers substantially conforming to the smaller diameter well would extend downwardly therein and be substantially supported, circumferentially, while those containers of a larger diameter would need to be retained in the larger diameter well. The containers not substantially conforming to either the smaller or larger diameter well would be presented with the same support problems as the above-mentioned single diameter container holders. That is, these containers would be easily knocked over, slide around in the receiving well and/or tip over under normal driving conditions. Typical of this design may be found in U.S. Pat. No. 4,721,216 to Kinder.

Other attempts to provide container holders for vehicles capable of receiving a variety of different and/or cross-sectional dimension containers are disclosed in U.S. Pat. Nos. 541,864 to Loomis; 4,783,037 to Flowerday and 4,765,581 to Wallace et al.. These three references, however, are mechanically complex, requiring the cooperation of numerous moving and stationary parts to adapt to differing diameter containers. These references, further, often require two hands when inserting or withdrawing the container from the holder; a practice of which can be distracting for the vehicle operator, his passengers and other motorists. In addition, these references require structures capable of vertical support to carry the weight of the container and its contents thereon. Moreover, Flowerday and Wallace do not provide substantial perimetric and lateral support to the container and are best suited to retain only cylindrical-shaped containers. Loomis, in comparison, only provides substantial perimetric and lateral support to rectangular containers which have a predetermined width.

U.S. Pat. No. 4,964,600 to Lee discloses an insulated cup holder having a flexible base portion formed to be placed on uneven surfaces. Lee provides an annular member dimensioned to receive a cup and having plurality of evenly spaced, radially-inwardly directed cup-supporting fingers. These fingers contact the perimeter of the cup to centrally position it in the receiving well so that an insulating area of dead air space surrounds the cup. These fingers, however, provide very limited capability to accommodate different container diameters and/or cross-sectional dimensions. Moreover, this device also requires two hands to insert or withdraw the container from the holder; unless the fit is very loose.

DISCLOSURE OF INVENTION

Accordingly, it is an object of the present invention to provide a container holder assembly for a vehicle which laterally supports a container therein.

Another object of the present invention is to provide a container holder assembly which substantially perimetrically supports a variety of different diameter and/or transverse cross-sectional dimension containers.

It is another object of the present invention to provide a container holder assembly which may be retrofit to most vehicles.

Yet another object of the present invention is to provide a container holder assembly which simplifies insertion and withdraw of the container therefrom.

It is a further object of the present invention to provide a container holder assembly for a vehicle which is durable, compact, easy to maintain, has a minimum number of components, is easy to use by unskilled personnel, and is economical to manufacture.

The present invention includes a container holder assembly for use in a vehicle for support of an elongated container in a substantially vertical orientation. The holder assembly comprises a base having a wall, and a substantially rigid retaining collar. The collar is mounted to the base and defines an opening dimensioned to receive the container therethrough. A flexible sleeve is mounted to the collar and extends around and downwardly from the collar to define a passageway which is formed to receive the container when positioned through the opening. An elastic band is mounted to one of the base and the sleeve and is positioned below the retaining collar. Further, the band extends around the passageway and is sufficiently resilient to substantially perimetrically and laterally support the container about a midportion thereof.

The container holder assembly of the present invention provides substantial perimetric and lateral support to retain a variety of different diameter containers in an upright orientation. Although the present invention is particularly suitable for receiving cylindrical containers for substantial circumferential lateral support, other transverse cross-sectional dimensions may be substantially perimetrically and laterally supported as well.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is top perspective view of a container holder assembly for a vehicle constructed in accordance with the present invention.

FIGS. 2A and 2B are fragmentary top plan views of the container holder assembly of FIG. 1 illustrating support to two containers of different circumferential dimension.

FIG. 3 is a top perspective, schematic view of a resilient container receiving sleeve assembly of the container holder assembly of FIG. 1.

FIG. 4 is a side elevation view of the receiving sleeve of FIG. 3, with the sleeve stretched out on a flat surface.

FIG. 5 is an enlarged, fragmentary, end elevation view, in cross-section, of a collar-receiving upper end of the resilient sleeve taken substantially along the plane of line 5—5 in FIG. 4.

FIG. 6 is an enlarged, fragmentary, end elevation view, in cross-section, of a perimetrically extending elastic band of the container holder assembly taken substantially along the plane of line 6—6 in FIG. 4.

FIG. 7 is a fragmentary, enlarged, bottom plan view, in cross-section, of a gathering of container sleeve caused by the elastic band taken substantially along the plane of line 7—7 in FIG. 4.

BEST MODE OF CARRYING OUT THE INVENTION

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Attention is now directed to FIG. 1, where the subject container holder assembly, generally designated 20, is illustrated. Container holder assembly 20 is particularly useful when mounted in a vehicle interior (not shown) and formed to support an elongated container 22 (shown in phantom lines) in a substantially vertical orientation. Briefly, container holder assembly 20 comprises a base 24 having a wall portion 28 and a substantially rigid retaining collar, generally designated 26, mounted to base 24. Retaining collar 26 defines an opening 30 which is dimensioned to receive container 22 through opening 30. Flexible sleeve means, generally designated 32, is mounted to collar 26 and extends around and downwardly from collar 26 to form a passageway 34 for receipt of container 22 when positioned through opening 30. Elastic band means 36, mounted to one of base 24 and sleeve means 32, is positioned below retainer collar 26 and extends around passageway 34. Elastic band means 36 is sufficiently resilient to substantially perimetrically and laterally support container 22 about a midportion thereof.

Accordingly, one advantageous feature of the container holder assembly 20 of the present invention is to provide substantial perimetric and lateral support to container 22 placed therein for orientation in an upright position. More importantly, assembly 20 is capable of accommodating a variety of different cross-sectional dimension containers 22 while providing the above-mentioned lateral support. This feature, for example, is best illustrated in FIGS. 2A and 2B where container 22' (FIG. 2A) is effectively laterally supported, perimetrically, about its midportion in an equal manner as larger diameter container 22 (FIG. 2B). Further, container holder assembly 20 is suitable to uphold containers 22 of a different cross-sectional shape (i.e., square, rectangular, hexagonal, etc.) while still providing substantial perimetric and lateral support about their midportion.

This unique configuration offers simple one-handed operation to insert or withdraw container 22 from holder assembly 20 while automatically adjusting to the container diameter or cross-sectional shape. Hence, operator convenience is substantially facilitated; especially during vehicle operation. In contrast, the prior art container holders often required two-handed operation and were problematic when attempting to perimetrically support containers having cross-sectional dimensions non-conforming to those dimensions of the predetermined receiving well.

Referring now to FIGS. 2A, 2B and 4, it can be viewed that sleeve means 32 is generally fabricated from a sheet-like material 38 formed to receive and extend downwardly from collar 26. Material 38 is preferably flexible, such as a cloth fabric, vinyl, leather or the like, so that passageway 34 can expand radially outward from a relaxed position to a stretched position, as will be described in greater detail below.

Because of the flexibility of sheet-like material 38, holder assembly 20 includes a relatively rigid retaining collar 26 mounted to an upper end portion 40 of sheet-like material 38 to provide peripheral rigidity about opening 30. Collar 26 further facilities formation of the generally shape of sleeve means 32 and passageway 34 extending downwardly from opening 30. Accordingly, sleeve means 32 retains its flexibility to expand and contract below collar 26 (i.e., midportion of sleeve means 32) while being peripherally rigid about opening 30. Sheet-like material 38, hence, will not collapse radially inward which would impede entrance of container 22 into passageway 34.

In accordance with the present invention, elastic band means 36 provides a structure for perimetrically and laterally supporting container 22 when positioned in passageway 34 of sleeve means 32 even though the container has a diameter much smaller than collar 26. Elastic band means 36 includes an elastic strip 42 (FIGS. 4 and 6) extending around passageway 34 which is formed to resiliently expand from a relaxed position to an expanded position. Because elastic strip 42 is sewn to sheet-like material 38, as best viewed in FIG. 6, sleeve means 32 also moves between the relaxed position, where passageway 34 is generally positioned at its smallest transverse cross-sectional dimension when no container is received therein, and the expanded position (FIGS. 2A or 2B), where container 22 is positioned in passageway 34 and stretches elastic strip 42 radially outward. Hence, both elastic band means 36 and sleeve means 32 cooperate to perimetrically and laterally support container 22. Accordingly, elastic band means 36, while being substantially flexible, resiliently draws sleeve means 32 peripherally around the transverse perimeter of container 22 to provide substantial lateral support. Additionally and very importantly, elastic band means 36 automatically conforms passageway 34 to containers 22 of different perimetric shapes. This feature promotes one-handed operation of holder assembly 20 during insertion or withdrawal from passageway.

As shown in FIG. 6, elastic strip 42 extends peripherally around a midportion of sleeve means 32 and is mounted to sheet-like material 38 in a fashion causing the same to gather (FIG. 7) similar to an elastic waist band. This configuration allows elastic strip 42 to expand passageway 34 of sleeve means 32 radially outward to the stretched position.

In the preferred form, one end 44 of elastic strip 42 is secured to a first side portion 46 of base 24 (on one side of wall 28) while an opposing end 48 of elastic strip 42 is secured to a second side portion 50 of base 24 (the opposite side of wall 28). In a similar fashion, one edge portion 52 of sleeve means 32 (i.e, sheet-like material 38) is mounted to first side portion 46 while an opposing edge portion 54 of sleeve means 32 is mounted to second side portion 50. Hence, sleeve means 32 and elastic band means 36 are more rigidly mounted to base 24 while still providing sufficient flexibility radially outward of passageway 34 so that elastic band means and sleeve means 32 perimetrically and laterally support container 22 received therein. Further, by partially securing sheet-like material 38 to base 24 in a vertical manner, sleeve means 32 is provided with sufficient rigidity to counteract any tendency toward inversion of sleeve means 32 during withdrawal of container 22 from passageway 34.

Moreover, as best viewed FIGS. 1 and 2, wall 28 is formed to provide an integral section of passageway 34. Since sleeve means 32 and elastic band means 36 are secured to base 24, as clearly shown in FIGS. 2A and 2B, both sleeve means 32 and elastic band means 36 cooperate to securely retain container 22 against wall 28. This provides additional lateral support for container 22 when retained therein. Accordingly, during insertion of container 22 through opening 30 and into passageway 34, elastic band means 36 accommodates container 22 by expanding passageway 34 from the relaxed position to the stretched position. As elastic band means 36 stretches radially outward from the relaxed position, band means 36 resiliency draws container 22 against wall 28 for additional lateral support.

In the preferred embodiment, sheet-like sleeve material 38 includes a collar-receiving loop 56 (FIG. 5) extending across upper end portion 40 thereof (perimetrically about sleeve means 32) which is formed and dimensioned to receive collar 26. As indicated by arrow 58 in FIG. 3, sleeve means 32 is mounted to collar 26 by directing collar 26 through loop 56 so that material 38 substantially conforms to the peripheral shape of collar 26. Moreover, the general shape of sleeve means 32 is formed by being partially suspended from collar 26.

A break or gap 60 is preferably provided in collar 26 (FIG. 3) so that collar 26 does not completely encircle opening 30. Wall 28 of base 24 completes or fills gap 60 of collar 26. One end 62 of collar 26 is mounted to first side portion 46 of base 24 by fasteners (not shown) while an opposing end 66 of collar 26 is mounted to second side portion 50 of base 24. FIG. 3 illustrates that the opposing end 66 of collar 26 further includes an arm portion 68 extending outward therefrom which furnishes additional stability when mounted to second side portion 50. Together, collar 26 and wall 28 form opening 30 to passageway 34. Collar 26 is preferably annular shaped so that collar 26 and wall 28 form a substantially circular opening 30. Wall 28 further is preferably substantially arcuate about a substantially vertically oriented axis. Hence, container holder assembly 20 is particularly suitable for laterally supporting elongated cylindrical containers 22 against wall 28, such as thermos-type containers, bottles or the like. It will be understood, however, that elastic band means 36 is substantially resilient and flexible so that sleeve means 32 can conform to a variety of transverse dimensions. Further, collar 26 may define other shaped openings, depending on the desired application, without departing from the true scope and spirit of the present invention.

In the preferred form, container holder assembly 20 is particularly well suited to mount to the floor of the vehicle interior where a bottom surface 70 of base 24 rests thereon. Further, since sleeve means 32 and retainer collar 26 are positioned above bottom surface 70 to laterally support a midportion of container 22, holder assembly 20 is configured so that container 22 rests on the floor. This facilitates vertical support of container 22 by having the floor carry a substantial portion of the weight of container 22 and its contents.

Moreover, holder assembly 20 is preferably dimensioned to fit within a relatively narrow space, such as besides a passenger seat in a trailer/tractor cab. Therefore, as illustrated in FIG. base 24 is relatively elongated so that holder assembly 20 will not interfere with foot traffic. Base 24 also preferably includes a pair of cup or can receiving wells 72 and 72' in a top surface 74 thereof. Wells 72 and 72' are advantageously stepped at 73 and 73' to provide two fixed-diameter sizes in each well so as to accommodate, for example, a standard size beverage can and a larger coffee cup or mug. A receiving tray 76 is positioned between receiving wells 72 and 72' for retaining articles therein. Finally, base 24 may include a receiving pouch 78 for storing magazines or larger items.

What is claimed is:

1. A container holder assembly for use in a vehicle for support of an elongated container in a substantially vertical orientation, said holder assembly comprising:
   a base having a wall;
   a substantially rigid retaining collar mounted to said base and defining an opening dimensioned to receive said container therethrough;
   flexible sleeve means mounted to said collar and extending around and downwardly from said collar to define a passageway formed for receipt of said container when positioned through said opening; and elastic band means mounted to one of said base and said sleeve means and positioned below said retaining collar and extending around said passageway, said elastic band means being sufficiently resilient to independently provide substantial perimetric and lateral support to said container about a midportion thereof.

2. The container holder assembly as defined in claim 1 wherein, said wall of said base forms an integral portion of said opening and said passageway.

3. The container holder assembly as defined in claim 2 wherein, said sleeve means and said band means cooperate to retain said container against said wall.

4. The container holder assembly as defined in claim 3 wherein, said elastic band means includes an elastic strip member having one end mounted to a first side portion of said base and an opposing end mounted to an oppositely facing second side portion of said base.

5. The container holder assembly as defined in claim wherein, said elastic strip is further mounted to said sleeve means such that said elastic strip resiliently increases said passageway radially outwardly between a relaxed position and a stretched position.

6. The container holder assembly as defined in claim 3 wherein, said sleeve means includes a loop proximate an upper portion thereof and extending perimetrically therethrough, said loop being formed to receive said retaining collar.

7. The container holder assembly as defined in claim 6 wherein, said collar is substantially annular.

8. The container holder assembly as defined in claim 7 wherein, said wall is substantially arcuate and is oriented about a substantially vertical axis.

9. The container holder assembly as defined in claim 3 wherein, said sleeve defines a bottom opening, said base includes a bottom surface formed to rest on an interior floor of said vehicle, and said retaining collar and said sleeve means are position above said bottom surface such that substantially the whole weight of said container is supported by said interior floor.

10. The container holder assembly as defined in claim 9 wherein, said base is elongated, and said wall is positioned on one end thereof.

* * * * *

UNITED STATES PATENT AND TRADEMARK OFFICE
CERTIFICATE OF CORRECTION

PATENT NO. : 5,279,489
DATED : January 18, 1994
INVENTOR(S) : Glenn E. Wheelock et al It is certified that error appears in the above-indentified patent and that said Letters Patent is hereby corrected as shown below:

Column 4, line 28, delete "22" and insert --22"--.

Column 6, line 45, after "FIG." insert --1--.

Column 7, line 24, claim 5, after "claim" insert

--4--.

Signed and Sealed this

Twenty-first Day of June, 1994

Attest:

BRUCE LEHMAN

Attesting Officer    Commissioner of Patents and Trademarks